(12) United States Patent
Flordal et al.

(10) Patent No.: US 11,308,570 B2
(45) Date of Patent: Apr. 19, 2022

(54) VIDEO DATA PROCESSING SYSTEM FOR STORING FRAMES OF VIDEO DATA

(71) Applicant: Arm Limited, Cambridge (GB)

(72) Inventors: Lars Oskar Flordal, Uppsala (SE); Jakob Axel Fries, Lund (SE)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/442,711

(22) Filed: Jun. 17, 2019

(65) Prior Publication Data

US 2019/0392546 A1    Dec. 26, 2019

(30) Foreign Application Priority Data

Jun. 22, 2018    (GB) ..................................... 1810266

(51) Int. Cl.
    *G06T 1/00*        (2006.01)
    *G06T 1/60*        (2006.01)

(52) U.S. Cl.
    CPC .............. *G06T 1/0007* (2013.01); *G06T 1/60* (2013.01)

(58) Field of Classification Search
    CPC .......... G06T 1/0007; G06T 1/60; G06T 9/00; G06T 2207/10016; G09G 2360/125; G09G 2350/00; G09G 2340/02; G09G 5/363; G09G 5/00; G09G 2360/122; G09G 5/39; H04N 19/423; G06F 3/0604; G06F 3/0629; G06F 3/0638; G06F 12/0646; G06F 5/10; G06F 5/14; G10L 19/00
See application file for complete search history.

(56) References Cited

U.S. PATENT DOCUMENTS

| | | | |
|---|---|---|---|
| 5,822,504 A | 10/1998 | Ishibashi et al. | |
| 8,340,497 B2* | 12/2012 | Kuwata | G11B 27/326 386/241 |
| 9,342,859 B2* | 5/2016 | Ayanam | G06F 3/1454 |
| 2013/0194243 A1* | 8/2013 | Um | G09G 5/397 345/204 |
| 2014/0063030 A1* | 3/2014 | Metcalfe | G06T 1/60 345/531 |
| 2014/0281279 A1 | 9/2014 | Oh et al. | |
| 2016/0012856 A1* | 1/2016 | Cave, Jr | G11B 27/005 386/241 |
| 2017/0083999 A1* | 3/2017 | Saurabh | G06T 1/60 |
| 2019/0297283 A1* | 9/2019 | Douady | H04N 5/247 |

OTHER PUBLICATIONS

UK Search Report dated Dec. 14, 2018, GB Patent Application No. GB1810266.5.

* cited by examiner

*Primary Examiner* — Jennifer Mehmood
*Assistant Examiner* — Donna J. Ricks
(74) *Attorney, Agent, or Firm* — Vierra Magen Marcus LLP

(57) ABSTRACT

A data processing system includes a producer processor that produces a sequence of data outputs for use by consumer processors of the data processing system. The system also includes a memory for storing a sequence of data outputs produced by the data processor. The data processor encodes data outputs as encoded blocks of data, storing a particular encoded block of a first frame in a first location in the memory and an indication of the first location. The data processor stores a corresponding encoded block of a second data output in a second location and updates the indication to the second location.

13 Claims, 6 Drawing Sheets

VIDEO DATA PROCESSING SYSTEM FOR STORING FRAMES OF VIDEO DATA

BACKGROUND

The technology described herein relates to data processing systems, and in particular to the production and consumption of encoded blocks of data in (e.g. video) data processing systems.

In a data processing system, a "producer" processing unit may produce (generate) a stream of data that is then to be used (e.g. processed) by one or more other "consuming" processing units of the data processing system. An example of this would be in video encoding or decoding. For example, in a video encoding system, a video encoder may encode ("produce") a bit stream representing a sequence of video frames to be displayed that has been captured by a video camera or generated by a graphics processor. The encoded bit stream may then be "consumed" by a display processor, for example, for the purposes of displaying the sequence of video frames.

In such arrangements, the producer processing unit will typically store the data stream that it is producing in appropriate memory that is shared with (also accessible to) the consumer processing units that are to use the data stream, with the consumer processing units then reading the data stream from the memory for use.

The latency incurred in writing and reading data to and from the shared memory may be reduced (e.g. minimised) by allowing a consumer processing unit to read and process a data output produced by a producer processing unit (e.g. as part of the data stream) as that data output is being produced and written to the shared memory. In graphics or video processing such an arrangement is known as "front-buffer" rendering. This is in contrast, for example, to arrangements in which a data output such as a frame is first completely written out by the producer processing unit, before the consumer processing unit is able to start to use the data output.

However, a situation can arise in such arrangements, where the consumer processing unit tries to read data for (part of) a data output that has not yet been written fully to memory. The consumer processing unit may then read both new and old versions of the data output from the memory (e.g. in the case when the new data output is being written over an existing data output) and attempt to combine it in some way.

Consuming a mix of old and new versions of a data output may cause a number of problems for the data processing system. For example, when such a mix of data is output (e.g. for display) by the consumer processing unit, unwanted artefacts may be created. In graphics and video processing systems this effect is known as "tearing".

These problems may be worse when the data output is being generated in a block-wise encoded (e.g. compressed) form, such that the consumer processing unit can only process elements of (a block of) the data output once it has all the data for an entire block of the data output. In that case, if a consumer processing unit attempts to read an only partially written block, this can cause more significant artefacts or errors (e.g. corruption) in the use of the data output. It may also cause the consumer processing unit to deadlock.

The Applicants accordingly believe that there remains scope for improved handling of data outputs that are being shared between producing and consuming processing units in a data processing system, in particular when the data outputs are being processed and consumed via a shared memory.

BRIEF DESCRIPTION OF THE DRAWINGS

A number of embodiments of the technology described herein will now be described by way of example only and with reference to the accompanying drawings, in which.

DETAILED DESCRIPTION

Figure 1:
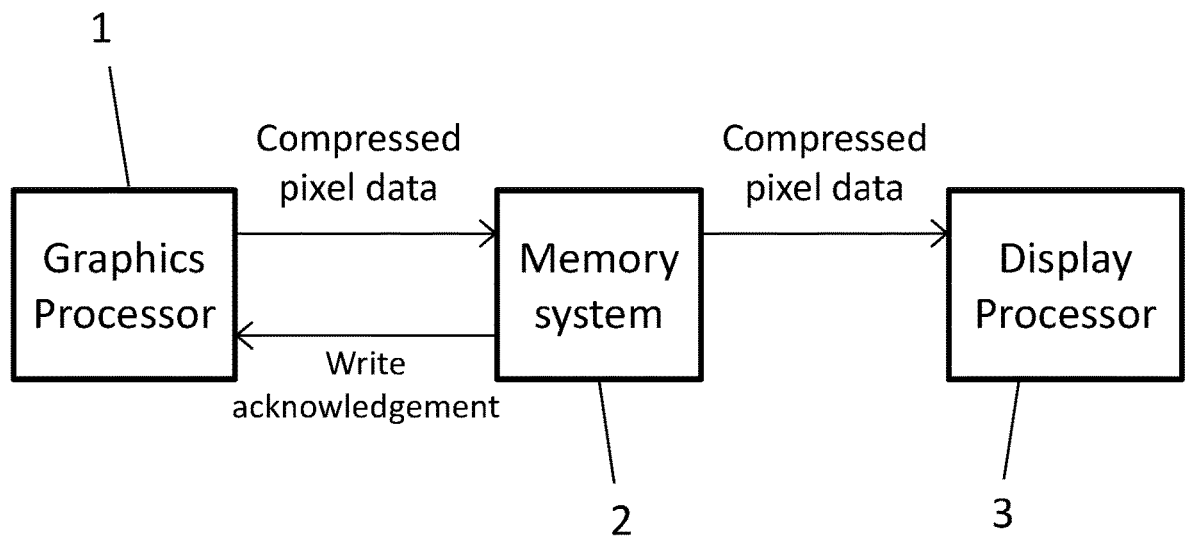
FIG. 1 shows a schematic overview of an embodiment of the technology described herein.

An embodiment of the technology described herein comprises a method of operating a video processing system in which a video processor of the video processing system is operable to produce a sequence of frames of video data for use by one or more consumer processors of the video processing system, the method comprising:

the video processor encoding a sequence of frames of video data, each frame being encoded as one or more encoded blocks of data, and storing the encoded blocks of data for each frame in turn in a region of memory from which encoded blocks of data will be read by a consumer processor for processing while the video processor is storing other encoded blocks of data for the frame in the region of memory;

the method further comprising:

the video processor:

storing a particular encoded block of data of a first frame in the sequence of frames in a first location in the region of memory; and storing, for the particular encoded block of data, an indication of the first location for use by a consumer processor when reading the particular block of data; and the video processor, when storing an encoded block of data of a second frame in the sequence of frames that corresponds to the particular encoded block of data in the first frame, storing that encoded block of data of the second frame in a second, different location in the region of memory to the first location; and updating the indication of the location of the encoded block in the region of the memory to the second location.

Another embodiment of the technology described herein comprises a video data processing system comprising:

a video processor operable to produce a sequence of frames of video data for use by one or more consumer processors of the video processing system; and a memory for storing a sequence of frames of video data produced by the video processor;

wherein the video processor comprises processing circuitry operable to:

encode a sequence of frames of video data, each frame being encoded as one or more encoded blocks of data; and store the encoded blocks of data for each frame in turn in a region of the memory from which encoded blocks of data will be read by a consumer processor for processing while the video processor is storing other encoded blocks of data for the frame in the region of memory;

wherein the processing circuitry is further operable to:

store a particular encoded block of data of a first frame in the sequence of frames in a first location in the region of the memory; and store, for the particular encoded block of data, an indication of the first location for use by a consumer processor when reading the particular block of data;

wherein the processing circuitry is further operable, when storing an encoded block of data of a second frame in the sequence of frames that corresponds to the particular encoded block of data in the first frame, to store that encoded block of data of the second frame in a second, different location in the region of memory to the first location; and update the indication of the location of the encoded block in the region of the memory to the second location.

The technology described herein relates to the encoding and storing of video (image) data using a video processor (e.g. of a video data processing system), such as a video processing unit. The video data is generated as a sequence of frames, with each video frame being divided into one or more (e.g. a plurality of) blocks of data (e.g. blocks of pixels of the frame). Each block is encoded individually (and then, e.g., decoded individually). The sequence of frames of video data are produced by the video processor for use by one or more consumer processors (e.g. of the video data processing system), e.g. one or more consumer processing units.

The encoded blocks of data for the sequence of frames are stored by the video processor in a region of memory of the video data processing system. The region of memory is used simultaneously by the video data processing system to store (write) encoded blocks of data for a frame and by the consumer processor(s) to read for the frame (other) encoded blocks of data that have been stored in the region of memory.

Thus the region of memory is used in the manner of (and, in an embodiment, comprises) a "front buffer", which is shared between and accessible to both the video processor and one or more consumer processors at the same time. This allows a consumer processor to read encoded blocks of data of a frame from the region of memory before the video processor has completed writing the entire same frame to the same region of memory, thus allowing the consumer processor to read encoded blocks of data of a frame while other blocks of the same (or a subsequent) frame are being written to the same region of memory.

Such "front buffer" rendering, for example, enables the continuous writing of encoded blocks of data in a sequence of frames of video data to a region of memory by the video processor while also allowing the continuous reading of already stored encoded blocks of data in the sequence by a consumer processor from the same region of memory. This helps to reduce the latency of producing and consuming the frames of video data, e.g. in contrast to a system in which a whole frame of image data has first to be committed to a "back" buffer before it is able to be promoted to a "front" buffer where it is then available for consumption. (Such front and back buffers are not each simultaneously accessible by a producer and a consumer for storing and reading data therefrom.)

The method and system of the technology described herein allow the region of memory to be used in this way, with encoded blocks of data, owing to an encoded block of data in a (second) frame, which corresponds to a previously stored encoded block of data from another (first) frame in the sequence of frames, being stored in a different (second) location to the previously stored block of data (which is stored in a first location), rather than overwriting the previous version of that block in memory. Thus, successive (corresponding) blocks of data in the sequence of frames are stored in the same region of memory but in different locations.

This allows the newly encoded blocks of data to be stored in (written to) the region of memory at the same time that the previously encoded and stored blocks of data are being used (read), while retaining valid encoded blocks of data in the region of the memory for use by a consumer processor, e.g. until the new encoded blocks of data are (e.g. fully written to memory and) available to be used.

An indication of the (first) location of a particular encoded block in the region of memory is also stored by the video processor. The indication is updated for the second (and, e.g., subsequent) frame(s) to provide the new, different location of the corresponding block in the region of memory for this frame.

Storing encoded blocks of data in successive frames in a sequence in different locations in the region of memory and providing the location of the latest (e.g. fully stored) version of the encode block in the region of memory has the effect that a consumer processor attempting to use an encoded block of data is able to locate the version of the encoded block in the region of memory (using the indication) that is available to be used and will, in some embodiments, always have available to them a "full" (e.g. "valid") version of the encoded block, i.e. the consumer processor simply uses the latest version of the location indication to locate the latest version of the encoded block that has been stored in the region of memory. This helps to ensure that a consumer processor is able to decode the block successfully (albeit it could be that the decodable version of the block that is used is from a previous frame when the new version of the block has not yet been written to the shared region of memory) by avoiding the consumer processor attempting to read an encoded block of data that has not yet been stored fully in the region of memory.

Ensuring that only valid encoded blocks of data are read, owing to the use of the indication of the location of the latest valid version of a particular block, for use by the one or more consumer processors helps to overcome the problems encountered previously when trying to use a partially updated block of data from a memory location and the unwanted artefacts this produces. Implementing this in a system that produces and consumes encoded blocks of data also helps to overcome the problems of data corruption and potential deadlocking of the one or more consumer processors when trying to use a partially updated encoded block of data from a memory location.

The sequence of frames of video data that the video processor encodes may be generated in any suitable and desired way, e.g. by the video processor. In one embodiment the sequence of frames of video data is captured by a video camera. In one embodiment the sequence of frames of video data is generated (rendered, e.g. in real time) by a graphics processor.

In an embodiment the sequence of frames of video data that has been generated is stored (e.g. by the video camera or graphics processor, e.g., in a memory) for use by the video processor when encoding the frames of video data as the one or more encoded blocks.

The sequence of frames of video data may be any suitable and desired sequence of video frames. There will be at least two frames in the sequence of source video frames, but in an embodiment there are more than two frames in the sequence of source video frames.

The first and second frames that are encoded in the sequence of frames by the video processor may be any suitable and desired frames of video data in the sequence of frames. In an embodiment, the first and second frames are encoded consecutively by the video processor, i.e. the second frame is the frame encoded next after the first frame. Thus, the first and second frames encoded and stored may be adjacent frames in the generated sequence of frames and/or in the sequence of frames to be consumed (e.g. displayed). However this may not always be the case, e.g. depending on the encoding format being used to encode the sequence of frames.

In an embodiment, the sequence of frames to be encoded comprises a stream of input frame data representing the sequence of frames of video data that is then encoded in the manner of the technology described herein to provide the one or more encoded blocks of data (e.g. as an encoded bitstream of data) that is then stored in the region of memory. The encoded blocks of data may then be, and in an embodiment are, transmitted and decoded (e.g. by a consumer processor which reads the encode blocks from the region of memory) to provide a sequence of output video frames, in an embodiment, for the purposes of display.

Thus, in an embodiment, the method comprises (and the video processor is operable to) receiving a sequence of frames of video data to be encoded, and encoding the frames in the manner of the technology described herein to produce the one or more encoded blocks of data which are then stored in the region of memory.

The video frames are encoded in a block-wise fashion, e.g. each frame of video data that is encoded is divided into respective blocks of pixels (sampling positions) representing respective regions (areas) of the video frame, which blocks are then respectively individually encoded as encoded blocks of data (e.g. within the encoded video data bitstream), such that respective individual blocks can be used (e.g. identified and decoded) by the one or more consumer processors from the encoded video data stored in the memory.

Thus, in an embodiment, the method comprises (and the video processor is operable to) processing a frame of video data to divide the video frame into blocks for encoding purposes.

The frames of video data may be encoded (compressed) as one or more blocks using any suitable and desired encoding (compression) technique, e.g. using the frame buffer compression techniques described in the Applicant's patents U.S. Pat. Nos. 8,542,939 B2, 9,014,496 B2, 8,990,518 B2 and 9,116,790 B2.

The blocks of data that the video frames are subdivided into for the encoding process may be any suitable and desired blocks of the video frames. They are, in an embodiment, rectangular in shape, e.g. square. The rectangular blocks may take any suitable and desired size. In an embodiment, the rectangular blocks each have a size between and including 4×4 pixels and 64×64 pixels, e.g. with each edge of the rectangular blocks having a size of $2^n$ pixels, where n is an integer (e.g. between and including 2 and 6).

In one embodiment, the frames of video data are generated (e.g. rendered) as individual blocks of data, e.g. by a graphics processor. In an embodiment, in such "tile-based" rendering, the generated blocks of data comprise "tiles", e.g. that tessellate over the area of a frame, and which are used (i.e. encoded) by the video processor to produce the encoded blocks of data (which, in an embodiment, correspond to the generated blocks of data).

The particular encoded block of data in the first frame of video data may correspond in any suitable and desired way to the corresponding encoded block of data in the second frame of video data. In an embodiment, the corresponding block occupies the same position (e.g. tile) (contains the same set of data elements) in the second frame of video data as the particular block in the first frame. When the frames are (e.g. each) encoded as a plurality of blocks of data, in an embodiment each of the encoded blocks of data in the second frame corresponds to a respective encoded block of data in the first frame. In an embodiment, each frame in the sequence of frames is encoded as the same set of blocks (e.g. tiles).

The region of memory that is used by the video processor to store the encoded blocks of data for the sequence of frames (and that is used by the one or more consumer processors when reading the encoded blocks of data) may be any suitable and desired region of memory that is accessible simultaneously to both (e.g. shared between) the video processor and the one or more consumer processors. Thus the memory in which the encoded blocks of data are stored may be any desired and suitable memory of or for the video processing system, such as, and, in an embodiment, a main memory for the processors in question (e.g. where there is a separate memory system for the processors in question), and/or a main memory of the video processing system that is shared with other elements, such as a host processor (CPU) of the video processing system.

The memory may be external (e.g. off-chip) to the processors in question. In an embodiment, the memory is an external DRAM. Other arrangements would, of course, be possible.

The region of memory could be arranged in any suitable and desired way. In an embodiment, the region of memory comprises a (frame) buffer that is accessible to both (e.g. shared between) the video processor and the one or more consumer processors simultaneously.

The region of memory is one that is used concurrently both by the video processor for storing encoded blocks of data and by the one or more consumer processors for reading the encoded blocks of data. Thus, in an embodiment, the region of memory comprises a (e.g. single) front buffer.

In an embodiment, the same region of memory is used for all of the one or more encoded blocks of data that are stored by the video processor for a frame, e.g. for all of the frames in the sequence of frames to be encoded and stored in this way. Similarly, in an embodiment, the same region of memory is subsequently used by the one or more consumer processors for all of the one or more encoded blocks of data that are to be used by the one or more consumer processors for a frame, e.g. for all of the frames in the sequence of frames to be used by the one or more consumer processors.

Within this region of memory, an encoded block of data in a first frame of video data is stored in a first location and then the corresponding (i.e. updated version) block of data in a second frame of video data is stored in a second, different location in the same region of memory. Owing to a different (second) location in the region of memory being used for storing the newer version of the encoded block of data (i.e. the encoded block from the second frame), the particular encoded block of data stored in the first location (i.e. the encoded block from the first frame) should not be, and, in an embodiment, is not, overwritten when the corresponding (second) encoded block of data is stored in the second location.

The first and second locations in the region of memory may be arranged in any suitable and desired way, to avoid an encoded block of data from the first frame being overwritten by the corresponding encoded block of data from the second frame. In an embodiment, the region of memory has the capacity to store all of the encoded blocks of a (first) frame (i.e. the entire data output for each frame) together with some additional "over-capacity" to store one or more additional encoded blocks of another (e.g. a subsequent (second)) frame.

This allows the region of memory to be able to store (e.g. a complete and decodable version of) all of the encoded blocks of a frame at any one time of all, such that they are available for use by a consumer processor, e.g. while the new versions of the corresponding blocks of data are being stored at different locations in the region of memory, while ensuring that there is "over-capacity" in the region of memory to provide an available "second" location for storing an encoded block of data from the second frame, while not overwriting the corresponding encoded block of data from the first frame.

This means that one or more encoded blocks of data from the first frame may be retained (for use by the one or more consumer processors) while the new versions of the corresponding blocks are being written to memory, e.g. until the complete new versions of the encoded blocks of data are available to the one or more consumer processors. The old versions may then be overwritten, e.g. by the corresponding encoded blocks of a subsequent frame.

The size of the over-capacity of the region of memory may depend on how many (e.g. the maximum number) blocks of data the video processor is able to process (e.g. encode and store) at any one time (i.e. blocks which are "in flight"). Providing an (e.g. limited) amount of over-capacity in the region of memory may help to reduce the size of the region of memory that needs to be provided and managed. However, this may require the locations in the region of memory available for storing newly encoded blocks of data to be tracked, e.g. by determining when a location storing a previously encoded block may be made available for overwriting.

Therefore, in one embodiment, the region of memory has the capacity to store (e.g. at least) all of the encoded blocks of the first frame and all of the encoded blocks of the second frame (i.e. the entire data output for two frames). This helps to ensure that there will always be an available location for storing a newly encoded block of data, while retaining the corresponding encoded block of data from a previous frame for use by a consumer processor until the new block has been fully stored.

The region of memory may be arranged in any suitable and desired way to store all of the encoded blocks of two (the first and second) frames. In an embodiment the region of memory comprises two (e.g. first and second) separate sub-regions of memory, which are, for example, two separate parts of the same (front) buffer.

Thus, in an embodiment, the method comprises (and the video processor is operable to) storing the particular encoded block of data from the first frame in the first sub-region of the region of memory, and storing the corresponding encoded block of data from the second frame in the second sub-region of the region of memory (e.g. the video processor alternates between storing the blocks of one frame to one of the sub-regions and the blocks of a subsequent frame to the other of the sub-regions). The first location is a location in the first sub-region of memory and the second location is a location in the second sub-region of memory (i.e. each of the first and second frames being processed has available to the video processor a respective sub-region for storing the encoded blocks of these frames).

Providing separate (e.g. delineated) sub-regions of memory in this way, with an encoded block of data (e.g. all encoded blocks) of the first frame being stored in one of these sub-regions and the corresponding block (e.g. all encoded blocks) of the second frame in the other sub-region, helps to ensure that a different (the second) location is provided for storing the newer encoded block of data. It also helps to avoid having to (positively) identify a second location that is different from the first location (e.g. as may be needed in the same single region of memory) such that the encoded block in the first location is not overwritten when storing the encoded block in the second location.

Instead, and in an embodiment this is what is done, the video processor can simply alternate ("ping-pong") between the two sub-regions of memory when storing corresponding encoded blocks of data for the first and second (and, in an embodiment, subsequent) frames, storing the encoded blocks of data in the alternate sub-regions of memory for the respective alternate frames.

When the region of memory in which the encoded data blocks are stored comprises two separate sub-regions of memory, these sub-regions are still both available to be read (e.g. at any one time) by the one or more consumer processors (owing to being part of the same region of memory), while other encoded blocks of data are being stored in (e.g. either or each sub-region of) the region of memory. Thus, in an embodiment, the two separate sub-regions are operable to be read by the one or more consumer processors (e.g. continuously), while the encoded blocks of data are being stored therein, such that they are simultaneously accessible by both the video processor and by a consumer processor. This is in contrast to a memory system having front and back buffers in which data is only ever written to the back buffer and read from the front buffer.

Similarly, the one or more consumer processors are (e.g. each) operable to read the two separate sub-regions of memory (e.g. at any given time) when reading a frame of video data from the region of memory. As will be discussed below, the one or more consumer processors simply use the indication of where the encoded blocks of data are stored and access the relevant location of the region of memory (which may be in either of the sub-regions).

The two separate sub-regions of memory may be arranged in any suitable and desired way, e.g. depending on how the sequence of frames is encoded as blocks of data. In one embodiment the blocks of data are encoded using the frame buffer compression techniques described in the Applicant's patents U.S. Pat. Nos. 8,542,939 B2, 9,014,496 B2, 8,990, 518 B2 and 9,116,790 B2. Using these techniques, a frame of data is encoded as one or more blocks of ("payload") data which are stored in a "body" buffer. A "header" buffer is used to store "header" data which indicates (e.g. points to) the locations in the body buffer at which the encoded blocks of data are stored.

Thus, in an embodiment, each of the two separate sub-regions of memory comprises a body buffer. Thus, in an embodiment, the region of memory comprises two separate body buffers, e.g. as part of the same front buffer.

In an embodiment, all of the blocks of data of a particular frame are stored in the same sub-region, e.g. the encoded blocks of the first frame in the first sub-region and the encoded block of the second frame the second sub-region. Thus, in an embodiment, each of the sub-regions has the capacity to store (e.g. at least) all of the encoded blocks of a frame (e.g. the entire data output for a frame). Thus, when a frame of video data is encoded as a plurality of encoded blocks of data and the region of memory comprises two separate sub-regions of memory, in an embodiment the method comprises (and the video processor is operable to) storing all of a plurality of encoded blocks of data of the first frame of video data in the first sub-region of memory and storing all of a plurality of encoded blocks of data of the second frame of video data in the second sub-region of memory.

In this case, for a frame of data encoded by the video processor, all the encoded blocks for the frame will be written to one of the sub-regions of memory. For the next frame in the sequence, all of the encoded blocks will be written to the other sub-region, and then for the next frame all the encoded blocks are written to the first sub-region, and so on, i.e. the video processor "ping-pongs" between the two sub-regions when storing the encoded frames.

It will be appreciated that storing all the encoded blocks for a frame in the same sub-region (and then all the encoded blocks for the subsequent frame in the other sub-region) is a simpler system to manage (e.g. compared to a system that decides on a block by block basis where to store the encoded blocks in memory). This is because the video processor simply needs to know (or be told or choose) which of the sub-regions to store the encoded blocks for the first frame. For subsequent frames in the sequence of frames, the video processor can then just alternate between the two sub-regions on a frame by frame basis, thereby ensuring that a corresponding encoded block of the second frame is stored in a different location (i.e. in the second sub-region) to the particular encoded block of the first frame (which is stored in the first sub-region).

The sub-region of memory in which to store any particular encoded block of data (or blocks of data for a particular frame) may be determined and set in any suitable and desired way. In one embodiment the sub-region to use for a frame is set by a driver for the video processor. Thus, in an embodiment, the driver is configured to set, e.g. state information for a frame to indicate (to the video processor) which sub-region to store an (e.g. all of the) encoded block(s) for the frame in.

As well as storing the particular encoded block of data in the first location of the region of memory, the video processor stores an indication of this first location. The indication of the second location is stored in the same way, updating the indication for a given encoded block as to its stored location, e.g., so that there is only ever one valid location indication corresponding to a given encoded block of data. This allows the one or more consumer processors to be able to locate (and then use) an encoded block of data.

The (e.g. updated) indication of the location of an encoded block of data may be stored in any suitable and desired part of the system. In an embodiment, the indication of the location of an encoded block of data is stored in the same region of memory as the encoded blocks of data. The indication of the location of an encoded block of data may be stored in any suitable and desired part of the region of memory. In an embodiment, the region of memory comprises a (e.g. further) sub-region of memory for storing the indication of the location an encoded block of data (and, in an embodiment, all such indications for locations in which encoded blocks of data are stored). In an embodiment, the sub-region comprises a header buffer. Thus, in an embodiment, the region of memory comprises two separate sub-regions (e.g. "body" buffers) for storing the encoded blocks of data, and a separate sub-region (e.g. a "header" buffer) for storing the indications of the locations of the encoded blocks of data.

The indication of the location of an encoded block of data may be stored in any suitable and desired format. In an embodiment, the indication of the location of an encoded block of data comprises header data. In an embodiment, the indication of an encoded block of data comprises a pointer to the location at which the encoded block of data is stored. When the region of memory comprises two separate sub-regions of memory, in an embodiment the indication of the location of an encoded block of data comprises a pointer to the sub-region of memory in which the encoded block of video data is stored.

Thus, in an embodiment, the video processor is operable to store the encoded blocks of video data in a (e.g. two) "body" buffer(s) and set of headers in a "header" buffer, which each point to the respective encoded blocks in the body buffer(s), e.g. using the frame buffer compression techniques described in the Applicant's patents U.S. Pat. Nos. 8,542,939 B2, 9,014,496 B2, 8,990,518 B2 and 9,116,790 B2.

In addition to the location of the encoded block of data (e.g. in the form of a pointer), the header data may also comprise any suitable and desired information. In one embodiment the header data for an encoded block of data comprises one or more (e.g. all) of: information regarding the size of the encoded block (e.g. stored as the byte size of the compressed data), information regarding how the data in the block has been compressed, information regarding the size (e.g. stored as the byte size) of subdivisions of the compressed block (e.g. for video encoding formats where it may be possible to decode only part of the encoded block of data).

The indication of the first and second locations may be stored (updated) in any suitable and desired way by the video processor. In an embodiment, an indication is (e.g. only) stored (updated) once the respective encoded block of video data has been fully stored such that it is at least available to be used by the one or more consumer processors.

This may be when the encoded block of data has been fully stored in the region of memory (e.g. in main memory). However, when the encoded block is (e.g. first) stored in a shared cache (where it can be accessed by a consumer processor), the indication may be stored (updated) when the encoded block has been fully stored in the cache. When such a cache comprises a cache hierarchy, the indication may be stored (updated) when the encoded block reaches a particular level in the cache, i.e. a level from where the encoded block can be accessed by a consumer processor. Thus, in some embodiments, the indication for an encoded block may be stored (updated) before the encoded block reaches its final location (e.g. in the region of memory). For example, in some embodiments the location indication may first be stored temporarily (e.g. in on-chip memory), while the encoded block of data is being stored. The location indication may then be stored (updated) (e.g. in the region of memory) such that it may be read by a consumer processor, once the encoded block of data has been stored fully, e.g. when the acknowledgement of the encoded block of data having been stored has been received (as discussed below).)

This helps to allow the one or more consumer processors to only be made aware of "valid" (fully stored) encoded blocks of video data, thus helping to prevent the one or more consumer processors from attempting to use any encoded blocks of video data that have not yet been fully stored in the region of memory. Once the indication for an encoded block has been stored (updated), the one or more consumer processors are able to use the encoded block whose location is indicated by the indication, knowing that it is valid and ready to be used without causing any problems. Storing (updating) the indications of the locations of the encoded blocks of video data in this way also reduces the synchronisation required between video processor and the one or more consumer processor.

In an embodiment, the method comprises (and the memory system is operable to) acknowledging (e.g. to the video processor) that an encoded block of data has been (e.g. fully) stored such that it is at least available to be used by the one or more consumer processors. Thus, in some embodiments, the acknowledgement may be provided when the encoded block of data has been fully stored, as outlined above, e.g. when a shared cache is used.

Providing such a write confirmation allows the video processor to store the indication of the location of the encoded block of data (e.g. only) when the encoded block of data has been (e.g. fully) stored. Thus, in an embodiment, the method comprises (and the video processor is operable to) storing (e.g. updating) an indication of the (first or second) location of an encoded block of data once the memory system has acknowledged (and, e.g., in response to the memory system acknowledging) that the encoded block of data has been (e.g. fully) stored, e.g. in the region of memory.

In these embodiments, once the indication has been updated for the second location of where the corresponding encoded block of data has been stored, such that the region of memory is now storing the full ("valid") encoded block of data, the particular encoded block of data stored in the first location may then be overwritten. This is because the region of memory now contains a fully stored new version of the encoded block of data, which is available to the one or more consumer processors via the indication of its location, such that the old version of the encoded block of data may no longer need to be accessible to the one or more consumer processors (i.e. because the indication has been updated to the second location).

In some embodiments the use of a location in the region of memory that is storing an old version of the encoded block of data for overwriting by (e.g. a subsequent version of) an encoded block of data may require (implicit or explicit) synchronisation between the video processor and the one or more consumer processors, to confirm that it is safe to overwrite the location. This may be needed, for example, when an old location indication has been cached by a consumer processor, e.g. for use in locating the old version of the encoded block of data.

While the indication may be updated to the new (second) location of the newly stored encoded block of data by providing a new (second) indication (e.g. making the old (first) version of the indication invalid (and the new (second) version valid)) in a different memory location, in an embodiment the indication (of the second location) is updated by storing the indication of the second location in the same location in the region of memory as (e.g. overwriting) the indication of the first location. This allows a consumer processor, when wishing to use an encoded block of data, to simply look up its location using the indication, such that it will be directed to a (e.g. the most) recent (e.g. fully written) version of the encoded block which it can then read. When a newer version of the encoded block is available, the indication is again updated such that a consumer processor can access the newer version of the encoded block.

When a frame of video data is encoded as a plurality of blocks of data, the indications of the locations of the respective encoded blocks of data will be stored at particular locations (e.g. known to the video processor and the one or more consumer processors) and updated (e.g. overwritten) each time the respective encoded blocks of data have been stored in the region of memory, in order to show (to the one or more consumer processors) the location of the new version of the respective encoded blocks of data.

The one or more consumer processors may use the one or more encoded blocks of data stored in the region of memory in any suitable and desired way. At a basic level, the one or more consumer processors are able to read the one or more encoded blocks of data of a frame of video data stored in the region of memory, locating these block(s) of data using the indication(s) of the location(s) of the block(s) in the region of memory. Thus the one or more consumer processors are able to use the one or more encoded blocks for a frame of video data once the indication(s) of the location(s) of the block(s) have been stored in the region of memory.

In an embodiment the method comprises a consumer processor (when the consumer processor wishes to use a particular encoded block of data):
reading the indication of the location of the encoded block of data;
reading the encoded block of data from the location in the region of memory indicated by the location indication for the encoded block of data; and
consuming (e.g. displaying and/or otherwise processing) the encoded block of data.

Correspondingly, in an embodiment, the video data processing system comprises one or more consumer processors (e.g. each) comprising processing circuitry operable (when the consumer processor wishes to use a particular encoded block of data) to:
read the indication of the location of the encoded block of data;
read the encoded block of data from the location in the region of memory indicated by the location indication for the encoded block of data; and
consume (e.g. displaying and/or otherwise processing) the encoded block of data.

In an embodiment, the consumer processor performs these (and any other optional) steps (e.g. as appropriate) for each of the encoded blocks it wishes to use for a frame in the sequence of frames.

In an embodiment, the method comprises (and the one or more consumer processors are operable to) decoding the one or more encoded blocks of data of a frame of video data.

Owing to the region of memory in which the encoded blocks of data are stored being configured such that a consumer processor is able to read encoded blocks of data from the region of memory while the video processor is storing other encoded blocks of data in the region of memory, in an embodiment the method comprises (and the processing circuitry of the video processor and a consumer processor is operable to):
a consumer processor reading one or more encoded blocks of data for a frame from the region of memory while the video processor is storing (writing) one or more other encoded blocks of data for the frame in the same region of memory.

The other encoded block(s) of data being stored by the video processor may be the corresponding block of data (in a subsequent frame) to the particular block of data being read by the consumer processor or it may be another block of data in the same or the subsequent frame. Thus a consumer processor may read an encoded block of data from the region of memory before the frame of video data has been stored fully in the region of memory, e.g. while other encoded block(s) of data of the same frame are being stored in the same region of memory, In an embodiment, the one or more consumer processors are (e.g. each) operable to access (e.g. the whole of) the region of memory (to read encoded blocks of data therefrom) while the video processor is storing encoded blocks of data in the region of memory.

Similarly, when the region of memory comprises two separate sub-regions (e.g. body buffers), a consumer processor may read an encoded block of data from one of the sub-regions while the video processor is storing other encoded blocks of data in the same sub-region (e.g. when reading a block in the same frame as the other block(s) being stored) or a consumer processor may read an encoded block of data from one of the sub-regions while the video processor is storing other encoded blocks of data in the other sub-region (e.g. when reading a block in the previous frame from the other block(s) being stored).

When the region of memory comprises two sub-regions in which the encoded blocks of data are stored, in an embodiment the one or more consumer processors are (e.g. each) operable to access either of the two sub-regions of the memory at any given time.

The one or more consumer processors may comprise any suitable and desired type of processors, e.g. any processors which use the encoded blocks of data after they have been encoded and stored in the region of memory. In one embodiment the consumer processors are operable to process the encoded blocks of video data further, e.g. to apply visual effect(s) to the video data. The one or more consumer processors may therefore comprise one or more graphics processors.

However, in an embodiment the one or more consumer processors comprise one or more display processors, wherein the display processors are operable to (e.g. use the encoded blocks of video data for the purposes of) display the encoded blocks of video data, e.g. to display the sequence of frames of video data.

Although the encoded blocks of data for a given frame may be stored in a variety of different places, e.g. in either of two sub-regions (e.g. body buffers) of the region of memory, the one or more consumer processors simply use the indication of the location of an encoded block of data to locate the block, as outlined above. Thus a consumer processor wishing to use an encoded block of data does not need to know how the region of memory is organised or where the one or more encoded blocks of data are stored in the region of memory (e.g. in advance of accessing the data).

In some embodiments, the one or more consumer processors may (e.g. each) be operable to pre-fetch (e.g. translation lookaside buffer) data from memory. When the region of memory storing the encoded blocks of data has an over-capacity, in an embodiment the one or more consumer processors are (e.g. each) informed of the arrangement of the region of memory (e.g. when the region of memory comprises two separate sub-regions) such that a consumer processor pre-fetches all the necessary information. Thus, In an embodiment, the one or more consumer processors are (e.g. each) operable to pre-fetch (e.g. translation lookaside buffer) data for both of the two separate sub-regions of memory.

In an embodiment, the one or more consumer processors are (e.g. each) set (e.g. by a software switch, e.g. a flag in state information) to use the two sub-regions of memory for accessing encoded blocks of data stored in the two sub-regions of memory (and for pre-fetching data). Alternatively a hardware block may be configured to set the one or more consumer processors to use the two sub-regions of memory for accessing encoded blocks of data stored in the two sub-regions of memory (and for pre-fetching data). Thus, in these embodiments, the one or more consumer processors are, for example, aware that there are two sub-regions of memory in which the encoded blocks of data may be stored.

There may be only one consumer processor that is using the encoded blocks of data, but in an embodiment there may be more than one (plural) consumer processors using the (same) encoded blocks of data. Where plural consumer processors are reading and using the same encoded blocks of data, in an embodiment each of the consumer processors operates (independently of the other consumer processors) in the manner of the technology described herein.

In some embodiments, e.g. when the frames of video data are (e.g. each) encoded as a plurality of blocks of data, the technology described herein is performed for each of the blocks of data in the frame, i.e. encoding and storing each block of a first frame in one location (with an associated indication) and then encoding and storing the corresponding block of a second frame in a different location, and updating the indication of the location of the stored encoded blocks accordingly.

Similarly, in an embodiment, the technology described herein is performed for a plurality of frames of video data in a sequence of frames, i.e. encoding and storing a (e.g. a plurality of) block(s) from one frame of video data in a different location to the corresponding block(s) from the previous frame, repeating this for each successive frame (relative to the previous frame) in the sequence of frames, and updating the indications of the locations of the stored encoded blocks.

While the above embodiments have been described primarily with reference to a video processing system, it will be appreciated that the technology described herein may be implemented in any suitable and desired data processing system in which a "producing" processor (e.g. producer processing unit) will generate and store encoded blocks of data for use by one or more "consuming" processors (e.g. one or more consumer processing units). Thus, as well as video processing systems, the technology described herein may also be used in other data processing systems, such as image processing systems, and graphic processing systems.

Thus, another embodiment of the technology described herein comprises a method of operating a data processing system in which a producer processor of the data processing system is operable to produce a sequence of data outputs for use by one or more consumer processors of the data processing system, the method comprising:

the producer processor encoding a first data output in a sequence of data outputs, each data output being encoded as one or more encoded blocks of data and storing the encoded blocks of data for each data output in turn in a region of memory from which encoded blocks of data will be read by a consumer processor for processing while the producer processor is storing other encoded blocks of data for the data output in the region of memory;

the method further comprising:

the producer processor:

storing a particular encoded block data of a first data output in the sequence of data outputs in a first location in the region of memory; and storing, for the particular encoded block of data, an indication of the first location for use by a consumer processor when reading the particular block of data; and the producer processor, when storing an encoded block of data of a second data output in the sequence of data outputs that corresponds to the particular encoded block of data in the first data output, storing that encoded block of data of the second data output in a second, different location in the region of memory to the first location; and updating the indication of the location of the encoded block in the region of the memory to the second location.

Another embodiment of the technology described herein comprises a data processing system comprising:

a producer processor operable to produce a sequence of data outputs for use by one or more consumer processors of the producer processing system; and a memory for storing a sequence of data outputs produced by the producer processor;

wherein the producer processor comprises processing circuitry operable to:

encode a sequence of data outputs, each data output being encoded as one or more encoded blocks of data; and store the encoded blocks of data for each data output in turn in a region of the memory from which encoded blocks of data will be read by a consumer processor for processing while the producer processor is storing other encoded blocks of data for the data output in the region of memory;

wherein the processing circuitry is further operable to:

store a particular encoded block of data of a first data output in a first location in the region of the memory; and store, for the particular encoded block of data, an indication of the first location for use by a consumer processor when reading the particular block of data;

wherein the processing circuitry is further operable, when storing an encoded block of data of a second data output in the sequence of data outputs that corresponds to the particular encoded block of data in the first data output, to store that encoded block of data of the second data output in a second, different location in the region of memory to the first location; and update the indication of the location of the encoded block in the region of the memory to the second location.

As will be appreciated by those skilled in the art, these embodiments may include any one or more or all of the optional features of the technology described herein, as appropriate. In particular, the features described with reference to frames of video data, in an embodiment, apply equally to instances of data; the features described with reference to the video processor, in an embodiment, apply equally to the producer processor; and the features described with reference to the one or more consumer processors, in an embodiment, apply equally to the one or more consumer processors. For example, in an embodiment, a (e.g. each) data output in the sequence comprises an array of data, e.g. a frame of video data.

Any one or more or all of the processors (e.g. processing units) of the technology described herein may be embodied as processor circuitry, e.g., in the form of one or more fixed-function units (hardware) (processing circuitry), and/or in the form of programmable processing circuitry that can be programmed to perform the desired operation. Equally, any one or more or all of the processors and processing circuitry of the technology described herein may be provided as a separate circuit element to any one or more of the other processors or processor circuitry, and/or any one or more or all of the processors and processor circuitry may be at least partially formed of shared processing circuitry.

The individual processors (e.g. processing units) may be part of an appropriate overall processor, such as a video processor (e.g. video processing unit) or a graphics processor (e.g. graphics processing unit).

The processors and/or data processing system described herein in any embodiment may comprise, or may be, or may form part of, a system on chip (SoC).

As well as the particular processors, the data or video processing system of the technology described herein can otherwise include any suitable and desired elements, and units, etc., that a data (e.g. video) processing system may include. Thus, in an embodiment, the data processing system further includes a host (e.g. central) processor. The host processor may, for example, execute applications that require data (e.g. video) processing by the processors of the system data processing system.

The host processor may send appropriate commands and data to the processors to control them to perform the data processing operations and to generate and/or use a data stream or streams required by applications executing on the host processor. To facilitate this, the host processor may execute a driver or drivers for the processors and/or may execute a compiler or compilers for compiling programs to be executed by a programmable execution unit(s) of the processor(s).

In embodiments, the processor(s) or system may comprise, and/or may be in communication with, one or more memories and/or memory devices that store the data described herein, and/or store software for performing the processes described herein. The processor(s) or system may comprise, and/or may be in communication with a display for displaying images based on the data stream. The processor(s) or system may comprise, and/or may be in communication with a video camera that generates arrays of data elements.

The technology described herein can be implemented in any suitable system, such as a suitably configured computer or micro-processor based system. In one embodiment, the technology described herein is implemented in a computer and/or micro-processor based system.

The various functions of the technology described herein can be carried out in any desired and suitable manner. For example, the steps and functions of the technology described herein can be implemented in hardware or software, as desired. Thus, for example, unless otherwise indicated, the various circuitry, functional elements, stages, units, and "means" of the technology described herein may comprise a suitable processor or processors, processing unit or processing units, controller or controllers, functional units, circuitry, processing logic, microprocessor arrangements, etc., that are operable to perform the various steps or functions, etc., such as appropriately dedicated hardware elements (processing circuitry) and/or programmable hardware elements (processing circuitry) that can be programmed to operate in the desired manner.

The various steps or functions, etc., of the technology described herein may be duplicated and/or carried out in parallel on a given processor. Equally, the various processors, etc., may share processing circuitry, etc., when desired.

Subject to any hardware necessary to carry out the specific steps or functions, etc., discussed above, the system can otherwise include any one or more or all of the usual functional units, etc., that data (e.g. video) processing systems include.

In one embodiment, the various functions of the technology described herein are carried out on a single data (e.g. video) processing platform that generates and outputs the data streams(s) in question.

It will also be appreciated by those skilled in the art that all of the described embodiments of the technology described herein can, and in an embodiment do, include, as appropriate, any one or more or all of the features described herein.

The methods of the technology described herein may be implemented at least partially using software, e.g. computer programs. Thus, further embodiments of the technology described herein comprise computer software specifically adapted to carry out the methods herein described when installed on a data (e.g. video) processor, a computer program element comprising computer software code portions for performing the methods herein described when the program element is run on a data (e.g. video) processor, and a computer program comprising code adapted to perform all the steps of a method or of the methods herein described when the program is run on a data (e.g. video) processor. The data (e.g. video) processor may be a microprocessor system, a programmable FPGA (field programmable gate array), etc.

The technology described herein also extends to a computer software carrier comprising such software which when used to operate a data (e.g. video) processing apparatus or system comprising a data (e.g. video) processor causes in conjunction with said data (e.g. video) processor said apparatus or system to carry out the steps of the methods of the technology described herein. Such a computer software carrier could be a physical storage medium such as a ROM chip, CD ROM, RAM, flash memory, or disk.

It will further be appreciated that not all steps of the methods of the technology described herein need be carried out by computer software and thus in further embodiments comprise computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable storage medium, for example, diskette, CD, DVD, ROM, RAM, flash memory, or hard disk. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical. It is contemplated that such a computer program product may be distributed as a removable medium with accompanying printed or electronic documentation, for example, shrink wrapped software, pre-loaded with a computer system, for example, on a system ROM or fixed disk, or distributed from a server or electronic bulletin board over a network, for example, the Internet or World Wide Web.

Like reference numerals are used for like features in the drawings (where appropriate).

The drawings show elements of a video processing apparatus and system that are relevant to embodiments of the technology described herein. As will be appreciated by those skilled in the art there may be other elements of the video processing apparatus and system that are not illustrated in the drawings. It should also be noted here that the drawings are only schematic, and that, for example, in practice the shown elements may share significant hardware circuits, even though they are shown schematically as separate elements in the drawings.

Embodiments of the technology described herein will now be described in the context of generating and displaying encoded video image data.

FIG. 1 illustrates the basic operation of the embodiments of the technology described herein showing the flow of data.

As shown in FIG. 1, a graphics processor 1 generates compressed pixel (image) data. The compressed pixel data, to be used for forming frames of video image data, is encoded (compressed) and written in blocks of the compressed pixel data by the graphics processor 1 to a memory system 2. The memory system 2 is shared between, and able to be accessed by, both the graphics processor 1 and a display processor 3.

The display processor 3 is able to read the encoded blocks of pixel data from the memory system 2, so that the encoded pixel data may be used for the purposes of displaying frames of video image data.

The memory system 2 is configured to provide a write acknowledgement once a block of compressed pixel data has been written to the memory system 2 by the graphics processor 1, as will be described in more detail below.

Figure 2:
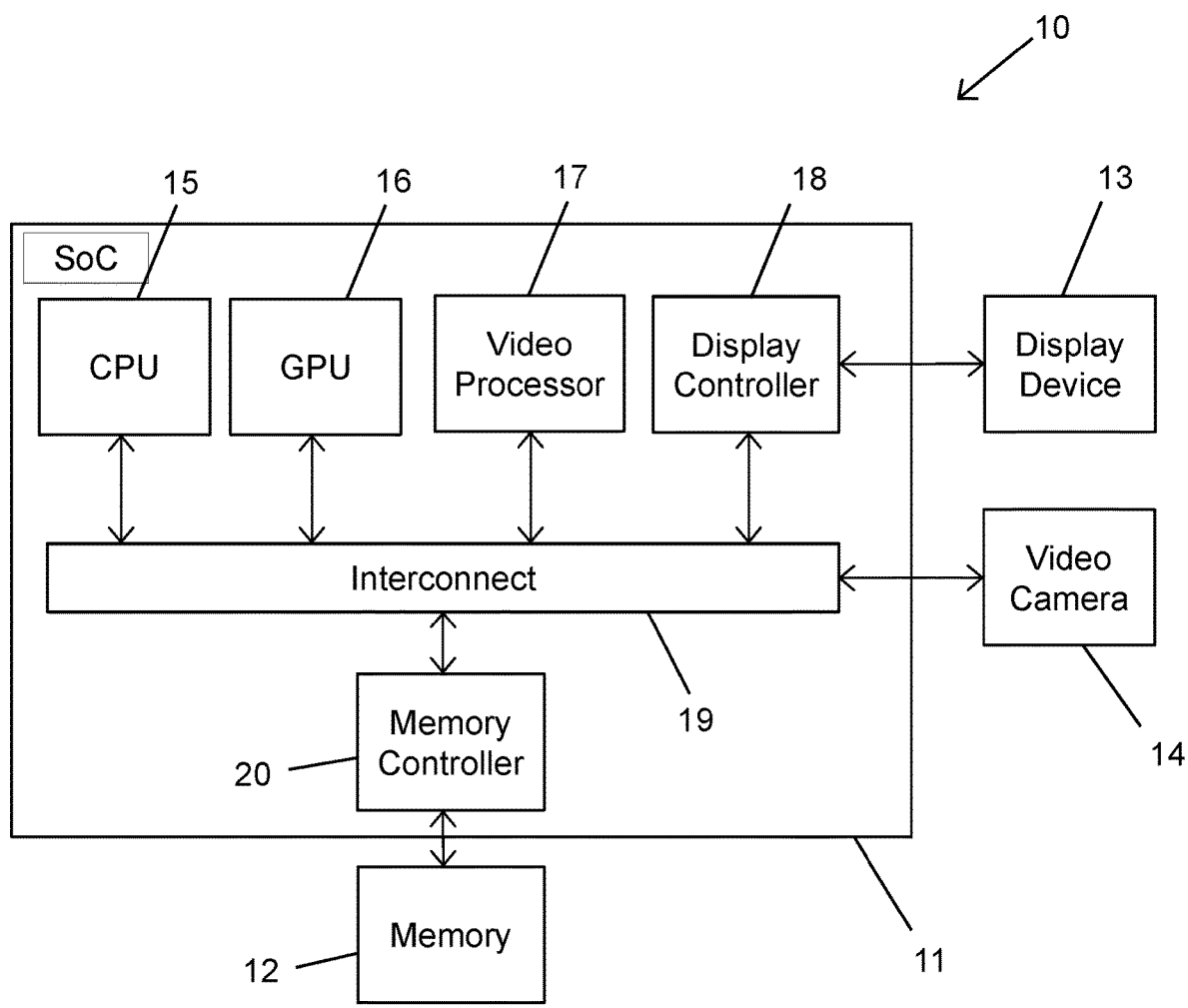
FIG. 2 shows schematically a data processing system that can operate according to embodiments of the technology described herein.

FIG. 2 shows schematically a data processing system 10 in which the present embodiments, such as the arrangement illustrated in FIG. 1, can be used and implemented.

As shown in FIG. 2, the data processing system 10 comprises a data processing apparatus in the form of a system on chip (SoC) 11. The system 10 also comprises off-chip (main) memory 12, a display device 13 and a video camera 14.

The SoC 10 comprises a central processing unit (CPU) 15, a graphics processing unit (GPU) 16, a video processor 17, a display controller 18, an interconnect 19 and a memory controller 20.

The GPU 16 or the video processor 17 shown in the system 10 of FIG. 2 may, for example, be used in an equivalent manner to the graphics processor 1 shown in FIG. 1. The display controller 18 may, for example, be equivalent to the display processor 3 shown in FIG. 1. The main memory 12 and the memory controller 20 may, for example, be equivalent to the memory system 2 shown in FIG. 1.

As shown in FIG. 2, the CPU 15, GPU 16, video processor 17 and display controller 18 communicate with each other via the interconnect 19 and with the memory 12 via the interconnect 19 and memory controller 20. The display controller 18 also communicates with the display device 13. The video camera 14 also communicates with the SoC 11 via the interconnect 19.

The video processor 17 may read in image data (e.g. generated by the GPU 16 or captured by the video camera 14) from memory 12 and/or from the video camera 14, encode the image data in a block-wise manner, and then output the encoded image data, e.g. for storage in memory 12 or for streaming to another device. The encoded image data can later be retrieved and decoded, e.g. by the video processor 17, or received and decoded by another device. The decoded image data can be output, e.g. by the display controller 18 to the display device 13 or by another device, for display.

In the present embodiments, it is assumed that the video processor 17 processes frames of video image data and/or parts of a given video frame to produce encoded blocks of image (pixel) data. The encoded blocks are then stored in a compressed form in a frame buffer within the off-chip memory 12, so that they may be decoded by the display controller 18 and displayed on the display device 13.

Figure 3:
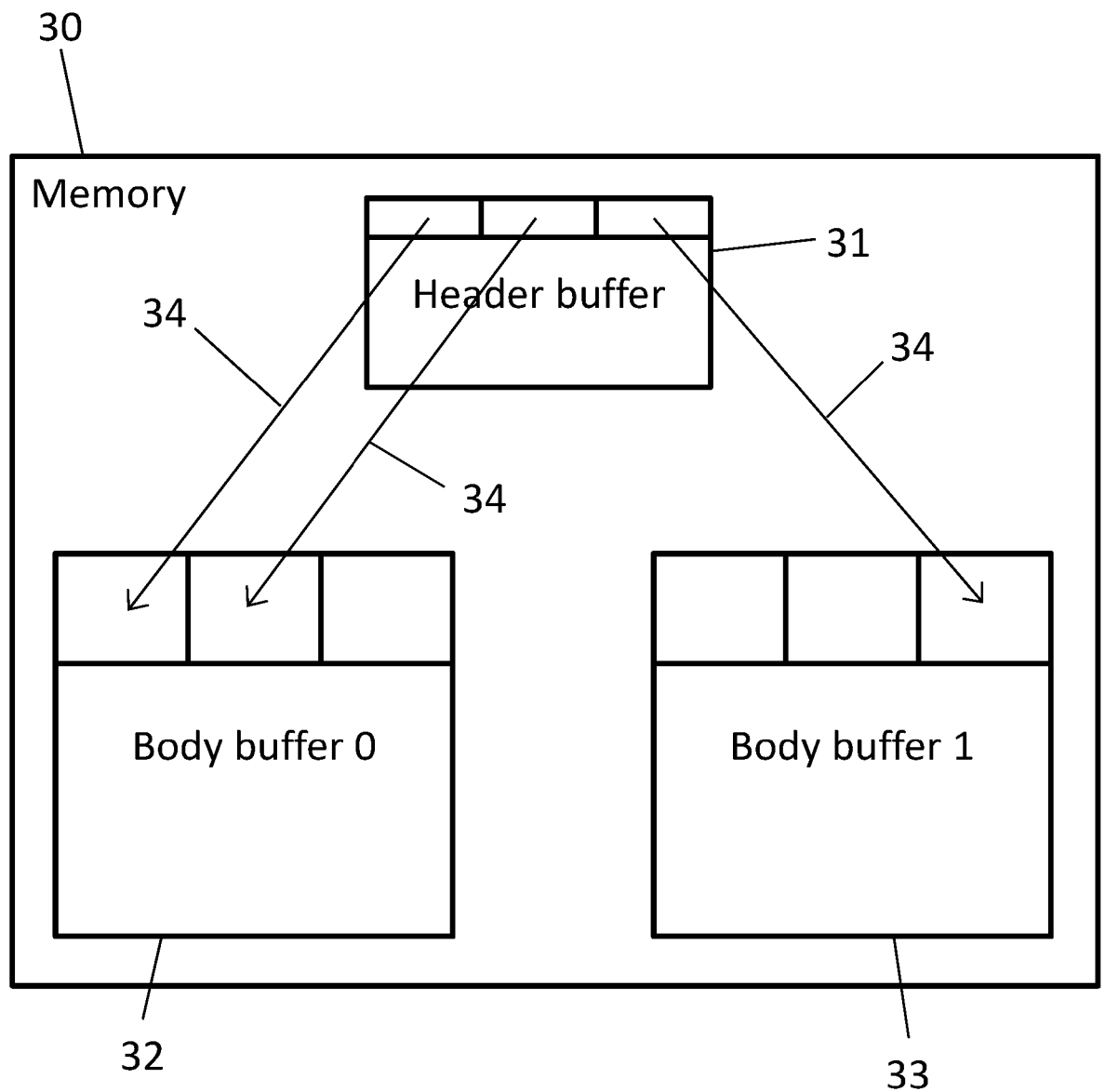
FIG. 3 shows schematically a memory system that can be used in embodiments of the technology described herein.

FIG. 3 shows schematically the layout of a memory 30, for use in embodiments of the technology described herein. The memory 30, which, for example, may be implemented in a data processing system as shown in FIGS. 1 and 2 (and thus may be equivalent to the memory system 2 shown in FIG. 1 or the off-chip memory 12 shown in FIG. 2), includes a front buffer for the storage of compressed pixel (image) data. This compressed pixel data may, for example, be produced by the graphics processor 1 shown in FIG. 1 or encoded by the video processor 17 shown in FIG. 2. The stored data may then, for example, be consumed by the display processor 3 shown in FIG. 1 or the display controller 18 shown in FIG. 2.

The front buffer of the memory 30 shown in FIG. 3 includes a header buffer 31 and two body buffers 32, 33. The body buffers 32, 33 are used to store the compressed pixel ("payload") data produced (e.g. by the graphics processor 1 shown in FIG. 1 or encoded by the video processor 17 shown in FIG. 2). The header buffer 31 is used to store pointers 34 that point to the compressed pixel data in the body buffers 32, 33.

The pointers 34 in the header buffer 31 are used, for example, by the display processor 3 shown in FIG. 1 or the display controller 18 shown in FIG. 2, to identify where the compressed pixel data to be displayed is in one of the body buffers 32, 33. Thus, in operation, the display processor 3 or the display controller 18 reads a pointer 34 in the header buffer 31, follows the pointer 34 to the location in one of the body buffers 32, 33 and reads the compressed pixel data at the location in the body buffer 32, 33.

Operation of the system shown in FIGS. 1, 2 and 3 will now be described with reference to the flow charts shown in FIGS. 4 and 6, and the layout of two frames of video data shown in FIG. 5. First the process of producing (rendering, compressing, writing out) the frames of image data will be described.

Figure 4:
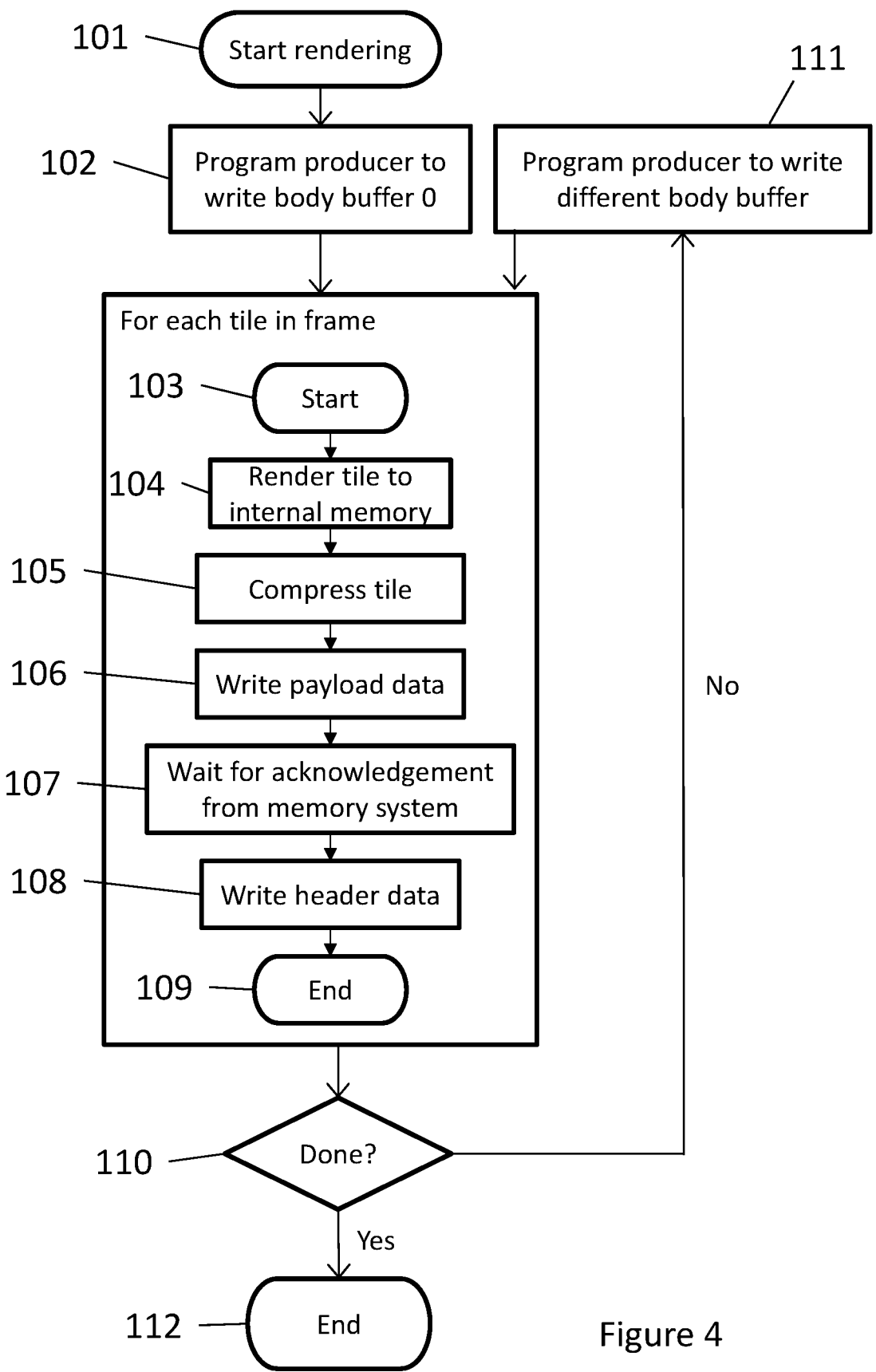
FIG. 4 is a flow chart showing the operation of a video processor in an embodiment of the technology described herein.

FIG. 4 shows a flow chart that details the steps for producing and writing compressed pixel data to memory, according to an embodiment of the technology described herein.

When a sequence of frames of video image data is to be produced, the graphics processor 1 (shown in FIG. 1) or the GPU 16 (shown in FIG. 2) starts rendering the pixel data (step 101, FIG. 4). The producer of the pixel data (e.g. the graphics processor 1 (shown in FIG. 1) or the video processor 17 (shown in FIG. 2), which will encode the pixel data rendered by the GPU 16) is initially set (by a driver) to write compressed pixel data to the body buffer "0" 32 (shown in FIG. 3) (step 102, FIG. 4).

The process of producing and writing out the compressed pixel data for a frame will now be described with reference to FIG. 5. FIG. 5 shows schematically two frames of video data 40, 50 in a sequence of frames that are encoded using an embodiment of the technology described herein.

In this embodiment, each frame 40, 50 is rendered, compressed and written out in "tiles" (smaller sub-regions into which a frame is divided). As shown in FIG. 5, the first frame 40 in the sequence of frames is divided into four tiles 41, 42, 43, 44, and the second frame 50 is divided into the corresponding four tiles 51, 52, 53, 54. (A frame of video data will generally include greater than four tiles; however, for the purpose of clarity only four tiles are shown in each of the frames shown in FIG. 5.) Each tile comprises a block (array) of sampling positions (pixels) and may be any suitable and desired size, but is typically a block of 16×16 sampling positions. It will be appreciated that the multiple tiles 41, 42, 43, 44, 51, 52, 53, 54 of a frame 40, 50 may be processed in parallel, e.g. on multiple processing cores of the GPU 16 and/or video processor 17, as appropriate.

For a given tile in a frame (e.g. tile "A" 41 in the first frame 40 shown in FIG. 5), the production process is started (step 103, FIG. 4) by the graphics processor 1 (shown in FIG. 1) or the GPU 16 (shown in FIG. 2) rendering the tile and writing the rendered tile to internal memory (step 104, FIG. 4). The graphics processor 1 (shown in FIG. 1) or the video processor 17 (shown in FIG. 2) then compresses the tile (step 105, FIG. 4). The rendered pixel data for the tile may be compressed using any suitable desired compression or encoding technique. One such frame buffer compression technique is described in the Applicant's patents U.S. Pat. Nos. 8,542,939 B2, 9,014,496 B2, 8,990,518 B2 and 9,116,790 B2.

The compressed pixel ("payload") data for the tile is then written to the body buffer "0" 32 (shown in FIG. 3) in the memory 30 (e.g. the memory system 2 shown in FIG. 1 or the off-chip memory 12 shown in FIG. 2) (step 106, FIG. 4). When all of the compressed pixel ("payload") data for the tile has been written to the body buffer "0" 32, the memory system 2 sends an acknowledgement to the producer of the compressed pixel data (as shown in FIG. 2).

The producer of the compressed pixel data waits for the acknowledgement from the memory system 2 (step 107, FIG. 4) and then writes corresponding header data to the header buffer 31 (shown in FIG. 2) (step 108, FIG. 4). The header data for the tile of compressed pixel data includes, for example, information regarding the size of the tile, information regarding how the pixel data is compressed and the location of the compressed pixel data. As shown in FIG. 3, the location of the compressed pixel data in the body buffer "0" 32 for the tile is provided using a pointer 34 from the header buffer 31 to the body buffer "0" 32.

The above process is performed for each tile in a frame. The different tiles may be rendered, compressed and written out in parallel to each other, e.g. using a multi-core processor. Once all the tiles in a frame have been rendered, compressed and written out to the body buffer "0" 32 (step 109, FIG. 4), the same process is performed for the next frame in the sequence of frames.

First, however, before the process is performed for the next frame, the producer of the pixel data (e.g. the graphics processor 1 (shown in FIG. 1) or the video processor 17 (shown in FIG. 2)) is set (by the driver) to switch the writing of the compressed pixel data for the new frame to the other body buffer, body buffer "1" 33 (shown in FIG. 3) (step 111, FIG. 4).

Writing the compressed pixel data for the new frame to the other body buffer "1" 33 avoids the tiles of compressed pixel data for the present frame in the body buffer "0" 32, which have pointers 34 to them from the header buffer 31, from being overwritten. This enables the tiles for the present frame to be read (e.g. by the display processor 3 (shown in FIG. 1) or the display controller 18 (shown in FIG. 2), by following the header pointers 34) as complete blocks of data for that frame, thus avoiding any "tearing" artefacts or problems with corrupted data. (It will be appreciated that once the compressed pixel data for the new frame has been written to the other body buffer, body buffer "1" 33, and the header data in the header buffer 31 has been updated, the compressed pixel data in the body buffer "0" 32 no longer has header pointers 34 pointing to this data and so can be overwritten safely for a subsequent frame.)

Thus the process of rendering, compressing and writing out tiles of compressed pixel data to the body buffer "1" 33 and header data to the header buffer 31 is performed for the next frame in the same manner as the first frame. For example, for the second frame 50 shown in FIG. 5, the video data for tile A' 51, corresponding to tile A 41 in the first frame 40, is encoded and stored in the body buffer "1" 33 and its header data in the header buffer 31.

Figure 5:
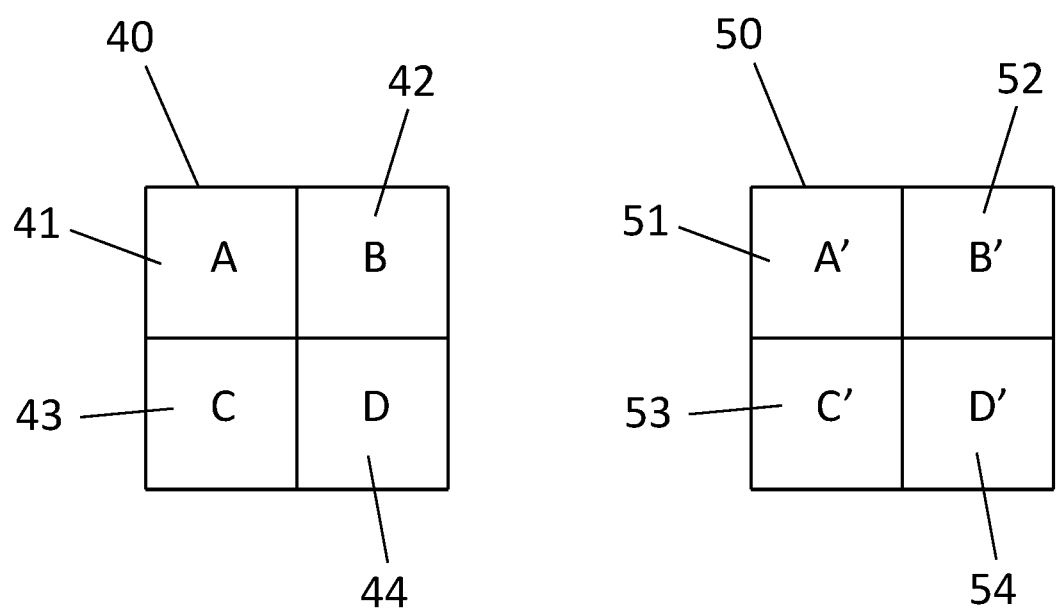
FIG. 5 shows schematically two frames of video data that are encoded using an embodiment of the technology described herein.

When the header data for the new frame is written into the header buffer 31, the header for an encoded tile in the new frame overwrites the corresponding header data for the corresponding tile in the previous frame (e.g. the header pointing to the encoded data for tile A' 51 in the second frame 50 shown in FIG. 5 overwrites the header which pointed to the encoded data for tile A 41 in the first frame 40). Thus (as will be described below, in reference to FIG. 6), when the compressed pixel data for the new frame is to be read, the new header data is read from the header buffer 31 and the pointers 34 are followed to the compressed pixel data in the body buffer "1" 33.

This process of producing frames of tiles of compressed pixel data is repeated in the same manner, for each frame switching the body buffer to which the compressed pixel data is written (step 111, FIG. 4). It is checked after each frame has been produced whether all the frames in a sequence of frames to be rendered have been produced and written out (step 110, FIG. 4). When the sequence of frames has been completed, the process is finished (step 112, FIG. 4).

The process of consuming (reading, decompressing, displaying) the produced frames of image data will now be described. With the frames of image data being written to a single front-buffer (albeit split up into two separate body buffers 32, 33), the frames of image data are able to be consumed at the same time as they are produced, as will be described.

Figure 6:
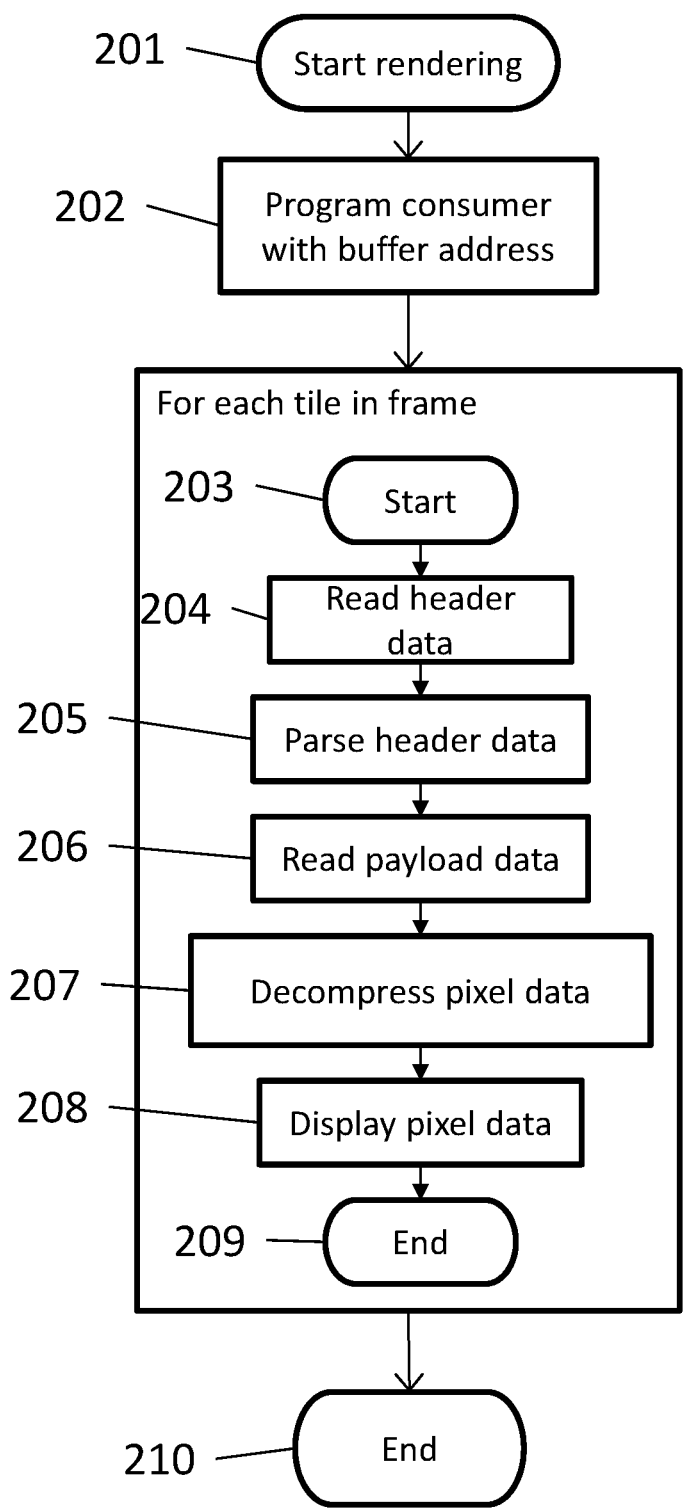
FIG. 6 is a flow chart showing the operation of a display processor in an embodiment of the technology described herein.

FIG. 6 shows a flow chart that details the steps for consuming the produced pixel data, according to an embodiment of the technology described herein.

In summary, as the rendered tiles are encoded and stored in the memory, they are decoded and recombined by the display processor 3 or the display controller 18 to provide the output frame, e.g. for display.

When a sequence of frames of video image data is to be displayed, at the same time as the sequence of frames of video image data is being produced (step 201, FIG. 6), as is described above with reference to FIG. 4, the consumer of the pixel data (e.g. the display processor 3 (shown in FIG. 1) or the display controller 18 (shown in FIG. 2), which will decode the compressed pixel data) is set (by a software switch) to read the compressed pixel data from the front-buffer in the memory 30, i.e. by using the header data in the header buffer 31 to determine the location of the compressed pixel data in the appropriate body buffer, 32, 33, as shown in FIG. 3 (step 202, FIG. 6).

In the same way in which the pixel data is rendered, compressed and stored in tiles, the compressed pixel data is read, decompressed and displayed in tiles in order to display each frame in the sequence of frames to be displayed. Thus, as will be described, the process for reading, decompressing and displaying the tiles of compressed pixel data is the same, and is repeated, for all of the tiles in a frame of video image data.

For a given tile in a frame, the consumption process is started (step 203, FIG. 6) by the display processor 3 (shown in FIG. 1) or the display controller 18 (shown in FIG. 2) reading the header data in the header buffer 31 (shown in FIG. 3) (step 204, FIG. 6). The display processor 3 or the display controller 18 parses the header data that it has read to determine the information in the header data for the tile, e.g. the size of the tile (typically stored as the byte size of the compressed data), how the pixel data is compressed and the location of the compressed pixel data (step 205, FIG. 6).

Using the location of the compressed pixel data for the tile that the display processor 1 or the display controller 18 has determined from the header data, the display processor 1 or the display controller 18 reads the compressed pixel "payload" data for the tile from the appropriate body buffer 32, 33 (step 206, FIG. 6).

It will be appreciated that owing to the way in which the header data is written into the header buffer 31 after all the payload data has been stored in the appropriate body buffer 32, 33, the display processor 3 or the display controller 18 is only able to read encoded blocks of pixel data that are valid and complete. At worst, the display processor 3 or the display controller 18 will read an old version of the encoded block of data, e.g. while the new version of the block is being written to the other body buffer 32, 33, but at least this block will be valid. The video processor 17 is able to write encoded blocks of data to the memory 12 while the display processor 3 or the display controller 18 are reading the corresponding blocks of data of a previous frame from the memory 12, with this not causing problems, because the new encoded blocks of data are not overwriting the previously stored and corresponding blocks of data. Instead they are being written to the other body buffer 32, 33.

Once the compressed pixel data for the tile has been read from the appropriate body buffer 32, 33, the display processor 1 or the display controller 18 uses the information in the header data (e.g. the size of the tile and how the pixel data has been compressed) to decompress the pixel data for the tile (step 207, FIG. 6).

The decompressed pixel data for the tile is then sent by the display processor 1 or the display controller 18 to be displayed, e.g. on the display device 13 shown in FIG. 2 (step 208, FIG. 6).

The above process is performed for each tile in a frame. The different tiles may be read, decompressed and displayed in parallel to each other, e.g. using a multi-core display processor. Once all the tiles in a frame have been read, decompressed and displayed (step 209, FIG. 6), the same process is performed for the next frame in the sequence of frames. Similarly, the process is repeated for each frame in the sequence of frames, until all the frames in the sequence have been displayed (step 210, FIG. 6).

A number of variations, modifications and alternatives to the above described embodiments of the technology described herein would be possible, when desired.

The present embodiments can be used in any desired and suitable data processing system in which a "producing" processor will generate and store encoded blocks of data for use by one or more "consuming" processors. Thus, as well as video processing systems, the present embodiments can also be used in other data processing systems, such as image processing systems, and graphic processing systems.

As can be seen from the above, the technology described herein, in some embodiments at least, comprises an improved mechanism for encoding and storing a sequence of frames of video data as encoded blocks of data when using a "front buffer" arrangement in which the encoded blocks are stored while other encoded blocks may be read from the same region of memory. This is achieved, in some embodiments of the technology described herein at least, by a video processor storing encoded blocks of data from (e.g. consecutive) frames of data in different locations in the memory, with an indication of the location of each encoded block also being stored and updated when blocks of data in subsequent frames are stored in the region of memory. The consumer processor(s) use the indications of the locations of the encoded blocks to then access the encoded blocks of data for subsequent use, e.g. display.

The foregoing detailed description has been presented for the purposes of illustration and description. It is not intended to be exhaustive or to limit the technology described herein to the precise form disclosed. Many modifications and variations are possible in light of the above teaching. The described embodiments were chosen in order to best explain the principles of the technology, and its practical application, to thereby enable others skilled in the art to best utilise the technology, in various embodiments and with various modifications as are suited to the particular use contemplated. It is intended that the scope be defined by the claims appended hereto.

What is claimed is:

1. A method of operating a data processing system in which a producer processor of the data processing system is operable to produce a sequence of data outputs for use by one or more consumer processors of the data processing system, the method comprising:
the producer processor encoding a first data output in a sequence of data outputs, each data output being encoded as a plurality of encoded blocks of data and storing the plurality of encoded blocks of data for each data output in turn in a region of memory of a memory system from which encoded blocks of data will be read by a consumer processor for processing while the producer processor is storing other encoded blocks of data for the data output in the region of memory,
wherein the region of memory comprises a first sub-region of memory and a second sub-region of memory, and
wherein the first sub-region of memory is separate and delineated from the second sub-region of memory;
the method further comprising:
the producer processor:
storing all of a plurality of encoded blocks of data of a first data output in the sequence of data outputs in a plurality of first locations in the first sub-region of memory;
the method further comprising, when storing each encoded block of data of the plurality of encoded blocks of data of the first data output in the sequence of data outputs:
the memory system, in response to the producer processor storing that encoded block of data of the first data output in one of the plurality of first locations in the first sub-region of memory, acknowledging to the producer processor that the encoded block of data has been stored such that it is at least available to be used by a consumer processor; and
the producer processor, in response to the memory system acknowledging to the producer processor that an encoded block of data has been stored, storing, for that encoded block of data, an indication of the first location in the first sub-region for use by a consumer processor when reading the block of data; and
the producer processor:
storing all of a plurality of encoded blocks of data of a second data output in a plurality of second locations in the second sub-region of the memory;
the method further comprising, when storing each encoded block of data of the plurality of encoded blocks of data of the second data output in the sequence of data outputs that corresponds to one of the plurality of encoded blocks of data in the first data output:
the producer processor storing that encoded block of data of the second data output in one of the plurality of second locations in the second sub-region of memory;
the memory system, in response to the producer processor storing that encoded block of the second data output in one of the plurality of second locations in the second sub-region of memory, acknowledging to the producer processor that the encoded block of data has been stored such that it is at least available to be used by a consumer processor; and
the producer processor, in response to the memory system acknowledging to the producer processor that an encoded block of data has been stored, updating the indication of the location of the encoded block in the memory to the one of the plurality of second locations in the second sub-region of the memory;
and wherein the method further comprises the consumer processor:
pre-fetching data for the first and second sub-regions of the memory;
reading the indication of the location of the encoded block of data;
reading the encoded block of data from the location in the region of memory indicated by the location indication for the encoded block of data; and
consuming the encoded block data.

2. The method as claimed in claim 1, further comprising not overwriting the particular encoded block of data of the first data output stored in the first location when storing the corresponding encoded block of data of the second data output in the second location.

3. The method as claimed in claim 1, wherein the region of memory comprises a header buffer for storing the indication of the location of the encoded block of data.

4. The method as claimed in claim 1, wherein the indication of the location of an encoded block of data comprises a pointer to the location at which the encoded block of data is stored.

5. The method as claimed in claim 1, the method further comprising a consumer processor reading one or more encoded blocks of data from the region of memory while the producer processor is storing one or more other encoded blocks of data in the same region of memory.

6. The method as claimed in claim 1, wherein the method comprises the consumer processor pre-fetching translation lookaside buffer data for the first and second sub-regions of the memory.

7. A data processing system comprising:
a producer processor operable to produce a sequence of data outputs for use by one or more consumer processors of the producer processing system; and
a memory system comprising a memory for storing a sequence of data outputs produced by the producer processor;
wherein the producer processor comprises a processing circuit operable to:
encode a sequence of data outputs, each data output being encoded as a plurality of encoded blocks of data; and
store the plurality of encoded blocks of data for each data output in turn in a region of the memory from which encoded blocks of data will be read by a consumer processor for processing while the producer processor is storing other encoded blocks of data for the data output in the region of memory;

wherein the region of memory comprises a first sub-region of memory and a second sub-region of memory, and wherein the first sub-region of memory is separate and delineated from the second sub-region of memory;

wherein the processing circuit is further operable to:
store all of a plurality of encoded blocks of data of a first data output in a plurality of first locations in the first sub-region of the memory;

wherein the memory system is operable to:
for each of the plurality of encoded blocks of data of the plurality of encoded blocks of data of the first data output that the processing circuit stores in the plurality of first locations in the first sub-region of the memory,
in response to the producer processor storing that encoded block of data of the first data output in one of the plurality of first locations in the first sub-region of memory,
acknowledge to the producer processor that the encoded block of data has been stored such that it is at least available to be used by a consumer processor;

wherein the processing circuit is further operable to:
in response to the memory system acknowledging to the producer processor that an encoded block of data has been stored,
store, for each of the plurality of encoded blocks of data, an indication of the first location in the first sub-region for use by a consumer processor when reading the block of data;

wherein the processing circuit is further operable to:
store all of a plurality of encoded blocks of data of a second data output in a plurality of second locations in the second sub-region of the memory;

when the processing circuit is storing each encoded block of data of the plurality of encoded blocks of data of the second data output in the sequence of data outputs that corresponds to one of the plurality of encoded blocks of data in the first data output:
the processing circuit is further operable to store that encoded block of data of the second data output in one of the plurality of second locations in the second sub-region of memory;
the memory system is operable to:
in response to the producer processor storing that encoded block of the second data output in one of the plurality of second locations in the second sub-region of memory,
acknowledge to the producer processor that the encoded block of data has been stored such that it is at least available to be used by a consumer processor; and
the processing circuit is further operable to update the indication of the location of the encoded block in the memory to the one of the plurality of second locations in the second sub-region of the memory; and wherein the data processing system comprises one or more consumer processors comprising a processing circuit operable to:
pre-fetch data for the first and second sub-regions of the memory;
read the indication of the location of the encoded block of data;
read the encoded block of data from the location in the region of memory indicated by the location indication for the encoded block of data; and
consume the encoded block of data.

8. The data processing system as claimed in claim 7, wherein the processing circuit is operable to not overwriting the particular encoded block of data of the first data output stored in the first location when storing the corresponding encoded block of data of the second data output in the second location.

9. The data processing system as claimed in claim 7, wherein the region of memory comprises a header buffer for storing the indication of the location of the encoded block of data.

10. The data processing system as claimed in claim 7, wherein the indication of the location of an encoded block of data comprises a pointer to the location at which the encoded block of data is stored.

11. The data processing system as claimed in claim 7, wherein the data processing system comprises one or more consumer processors comprising a processing circuit operable to:
read one or more encoded blocks of data from the region of memory while the producer processor is storing one or more other encoded blocks of data in the same region of memory.

12. The data processing system as claimed in claim 7, wherein the processing circuit of the one or more consumer processors is operable to pre-fetch translation lookaside buffer data for the first and second sub-regions of the memory.

13. A non-transitory computer readable storage medium storing computer software code which when executing on a video processing system performs a method of operating a data processing system in which a producer processor of the data processing system is operable to produce a sequence of data outputs for use by one or more consumer processors of the data processing system, the method comprising:
the producer processor encoding a first data output in a sequence of data outputs, each data output being encoded as a plurality of encoded blocks of data and storing the plurality of encoded blocks of data for each data output in turn in a region of memory of a memory system from which encoded blocks of data will be read by a consumer processor for processing while the producer processor is storing other encoded blocks of data for the data output in the region of memory,
wherein the region of memory comprises a first sub-region of memory and a second sub-region of memory, and
wherein the first sub-region of memory is separate and delineated from the second sub-region of memory;
the method further comprising:
the producer processor:
storing all of a plurality of encoded blocks of data of a first data output in the sequence of data outputs in a plurality of first locations in the first sub-region of memory;
the method further comprising, when storing each encoded block of data of the plurality of encoded blocks of data of the first data output in the sequence of data outputs:
the memory system, in response to the producer processor storing that encoded block of data of the first data output in one of the plurality of first locations in the first sub-region of memory, acknowledging to the producer processor that the encoded block of data has been stored such that it is at least available to be used by a consumer processor; and the producer processor, in response to the memory system acknowledging to the producer processor that an encoded block of data has been stored, storing, for that encoded block of data, an indication of the first location in the first sub-region for use by a consumer processor when reading the block of data; and the producer processor:

storing all of a plurality of encoded blocks of data of a second data output in a plurality of second locations in the second sub-region of the memory;

the method further comprising, when storing each encoded block of data of the plurality of encoded blocks of data of the second data output in the sequence of data outputs that corresponds to one of the plurality of encoded blocks of data in the first data output:

the producer processor storing that encoded block of data of the second data output in one of the plurality of second locations in the second sub-region of memory;

the memory system, in response to the producer processor storing that encoded block of the second data output in one of the plurality of second locations in the second sub-region of memory, system acknowledging to the producer processor that the encoded block of data has been stored such that it is at least available to be used by a consumer processor; and the producer processor, in response to the memory system acknowledging to the producer processor that an encoded block of data has been stored, updating the indication of the location of the encoded block in the memory to the one of the plurality of second locations in the second sub-region of the memory;

and wherein the method further comprises the consumer processor:

pre-fetching data for the first and second sub-regions of the memory;

reading the indication of the location of the encoded block of data;

reading the encoded block of data from the location in the region of memory indicated by the location indication for the encoded block of data; and consuming the encoded block data.

* * * * *